(12) United States Patent
Suel, II et al.

(10) Patent No.: US 7,958,584 B2
(45) Date of Patent: Jun. 14, 2011

(54) LOAD SIZE MEASURING APPARATUS AND METHOD

(75) Inventors: Richard D. Suel, II, Louisville, KY (US); Edward Hatfield, Louisville, KY (US); John Steven Holmes, Sellersburg, IN (US); Meher P. Kollipara, Louisville, KY (US); Shyam Ramamurthy, Louisville, KY (US); Jian Hua Zhong, Shang Hai (CN)

(73) Assignee: General Electric Company, Schenectady, NY (US)

( * ) Notice: Subject to any disclaimer, the term of this patent is extended or adjusted under 35 U.S.C. 154(b) by 588 days.

(21) Appl. No.: 12/032,028

(22) Filed: Feb. 15, 2008

(65) Prior Publication Data

US 2009/0205377 A1    Aug. 20, 2009

(51) Int. Cl.
*D06F 35/00* (2006.01)
*D06F 39/00* (2006.01)

(52) U.S. Cl. .............................. 8/158; 8/159
(58) Field of Classification Search ................ None
See application file for complete search history.

(56) References Cited

U.S. PATENT DOCUMENTS

| 7,162,759 B2 * | 1/2007 | Weinmann ............ 8/158 |
| 2005/0015890 A1 * | 1/2005 | Kim et al. ............. 8/158 |

* cited by examiner

*Primary Examiner* — Michael Barr
*Assistant Examiner* — Jason Y Ko
(74) *Attorney, Agent, or Firm* — Global Patent Operation; Stephen G. Midgley

(57) ABSTRACT

A method and apparatus for measuring a size of a load in a basket that is rotatably supported is presented. The method comprises determining an acceleration energy (AE) required to accelerate the basket; determining a friction energy (FE) required to maintain a stable rotational speed of the basket; subtracting the friction energy (FE) from the acceleration energy (AE) to obtain a load inertial energy (LE); and determining a load size from the load inertial energy (LE).

11 Claims, 7 Drawing Sheets

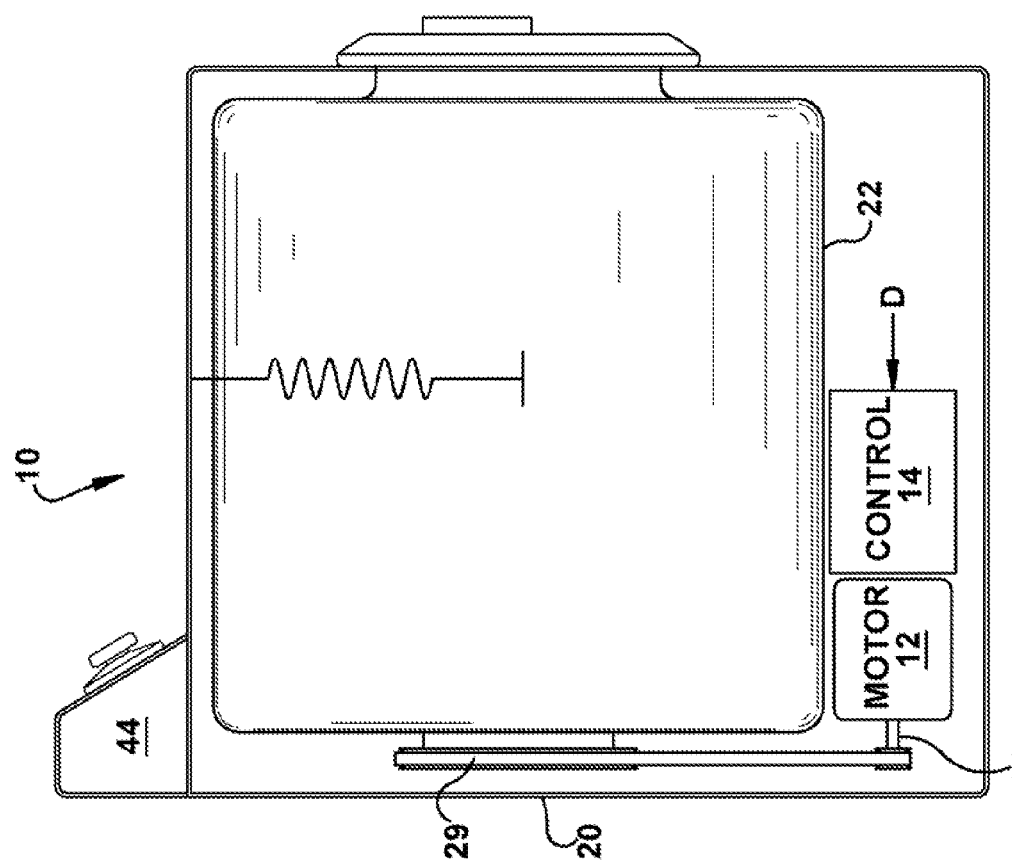
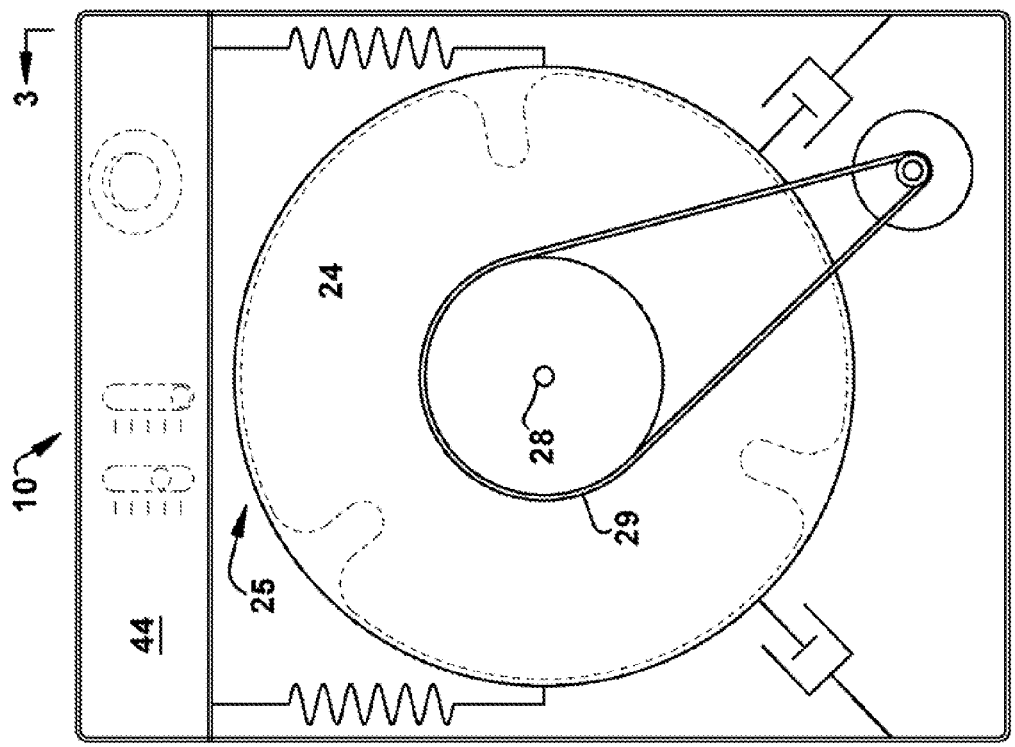

LOAD SIZE MEASURING APPARATUS AND METHOD

BACKGROUND OF THE INVENTION

1. Field of the Invention

The present disclosure is related to measuring an aspect of a load supported by a container. More particularly, the present disclosure is related to measuring a size of a load in a tub or basket that is subject to a rotational acceleration.

2. Description of Related Art

Vertical axis washing machines, also known as top loading washing machines, represent a large portion of the overall washing machine consumer market in the United States. Horizontal axis washing machines represent a smaller segment of the United State market and abroad typically represent a larger portion of the overall washing machine consumer market.

Most vertical and horizontal axis washing machines include a spin cycle for removing water and/or detergents from the laundry using centrifugal force and spinning a wash load tub, also referred to as a laundry tub ("tub") or basket. During a typical spin cycle, the motor, typically an induction motor, of the washing machine spins the tub at relatively high speed(s).

Historically induction motors used in washers have been single phase induction motors or PSC induction motors. More recently 3-phase induction motors, have been used in some commercially available washers. The 3-phase motors in washers for home use are typically powered by standard single phase AC household electric power. As part of a 3-phase induction motor washing machine, a circuit associated with the motor converts the single phase AC household electric power to three phase power; the three phase power is better at motor starting and operates more efficiently than single phase power.

A simplified explanation of an induction motor, ignoring losses follows: The induction motor has a rotor with a short-circuited winding inside a stator with a rotating magnetic field. The flux from the rotating field induces a current flow in the rotor. The frequency of the current flowing is equal to the difference between the rotational speed of the stator field and the rotational speed of the rotor. This difference in speed, or frequency, of the stator magnetic field and the rotor magnetic field is known as the slip.

The rotor current causes a rotor magnetic field, which is spinning relative to the rotor at the slip frequency and relative to the stator, at the stator applied frequency. The interaction between rotor magnetic field and the stator magnetic field generates a torque in the rotor.

A washing machine wash cycle has various modes such as fill, drain and spin, agitation, and spin. Load sensing can occur before, during or after various segments of the wash cycle. Knowing the amounts of water and detergent used in the wash cycle can be helpful in providing an efficiently run washing machine.

The weight of a load of clothes loaded into a clothes washer for washing is an important parameter in determining the proper amount of water and detergent to be used for the wash cycle. Large clothes loads require larger quantities of water than do small loads. Better clothes washability and significant water and energy savings can be achieved when the proper amount of water is filled into the washer tub for a given clothes load. Too much water or detergent is wasteful, and too little of either will generally adversely affect the effectiveness of the washing, and may result in increased energy consumption due to a higher load on the motor as a result of the inability of the clothes to move freely in the water. Additionally, load size may aid in determination of max spin speed and degree of load imbalance. For example, a 1 lb. load with 0.5 lb. imbalance may be more severe than a 10 lb. load with 0.5 lb. imbalance.

Techniques or methods of estimation of the load of clothes loaded into a washer employed by the washer itself are desirable in that it eliminates guesswork on the part of the machine operator which can lead to improper water fill or use of an improper amount of detergent. Knowing load size can also prevent damage to the washer by limiting max speed. Prior art techniques include displacement sensors mounted at tub springs; magnet and coil pickup sensing relative displacement of tub from chassis; and ultrasonic transducers. Prior art washing machines that use sensing hardware are costly due to the need for dedicated sensing hardware.

Another technique involves determining a load size by measuring a time required for a load to change speed when a known stimulus is applied such as a positive speed step or coasting. While suitable for its intended purposes, this method is not particularly suitable for horizontal axis washers that have two main sources of friction.

A first source of friction in a horizontal axis washer involves clothes rubbing against a door and/or a window of the washer. As the clothes spin around in the machine, they rub against the window causing friction. This friction increases as more clothes are added to the load.

A second source of friction (and a major source in a vertical axis washer) involves machine friction that is caused by bearings, belt tension and other variables of the washer. Machine friction may also change over time as the belt tension weakens or the bearings begin to wear out.

Accordingly, there is a need for a washing machine that overcomes, alleviates, and/or mitigates one or more of the aforementioned and other deleterious effects of prior art washing machines.

BRIEF SUMMARY OF THE INVENTION

In accordance with one embodiment of the present invention a method of measuring a size of a load in a basket that is rotatably supported comprises determining an acceleration energy (AE) required to accelerate the basket; determining a friction energy (FE) required to maintain a stable rotational speed of the basket; subtracting the friction energy (FE) from the acceleration energy (AE) to obtain a load inertial energy (LE); and determining a load size from the load inertial energy (LE).

In another aspect of the present invention a washer comprises a basket and a motor interconnected with the basket. The motor comprises a motor shaft, a speed sensor mounted near the motor shaft for sensing a rotational speed thereof and a motor control circuit. The motor control circuit comprises an inverter connected in circuit with the motor and a processor connected to receive a motor speed feedback value from the speed sensor. The processor may be configured to communicate with the inverter to accelerate the basket to a first stable rotational speed; determine a preliminary friction energy (PFE) required to maintain the first stable rotational speed of the basket; communicate with the inverter to accelerate the basket to a second stable rotational speed; iteratively determine an acceleration energy (AE) required to accelerate the basket from the first stable rotational speed to the second stable rotational speed; determine a friction energy (FE) from the preliminary friction energy (PFE); subtract the friction energy (FE) from the acceleration energy (AE) to obtain a load inertial energy (LE); and determine a load size from the load inertial energy (LE).

In another aspect, a method of measuring a size of a load in a basket that is rotatably supported comprises determining an acceleration energy (AE) required to accelerate the basket; determining a friction energy (FE) required to maintain a stable rotational speed of the basket; subtracting the friction energy (FE) from the acceleration energy (AE) to obtain a load inertial energy (LE); and determining a load size from the load inertial energy (LE).

In a further aspect, a circuit is configured to measure a size of a load in a basket that is rotatably supported. The circuit comprises a processor wherein the processor is configured to determine an acceleration energy (AE) required to accelerate the basket; determine a friction energy (FE) required to maintain a stable rotational speed of the basket; subtract the friction energy (FE) from the acceleration energy (AE) to obtain a load inertial energy (LE); and determine a load size from the load inertial energy (LE).

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining several embodiments of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

Further, the purpose of the foregoing Paragraph Titles used in both the background and the detailed description is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Paragraph Titles are neither intended to define the invention or the application, which only is measured by the claims, nor are they intended to be limiting as to the scope of the invention in any way.

The above-described and other features and advantages of the present disclosure will be appreciated and understood by those skilled in the art from the following detailed description, drawings, and appended claims.

BRIEF DESCRIPTION OF THE SEVERAL VIEWS OF THE DRAWINGS

FIG. 2 illustrates a cross sectional view of various elements of the exemplary horizontal axis washer of the present invention;

FIG. 3 illustrates a side view of the exemplary washer of the present invention along line 2-2 of the cross sectional view of FIG. 2;

DETAILED DESCRIPTION OF THE INVENTION

One embodiment of the present invention provides a method and apparatus for determining a load size in a rotatable basket that reduces the effects of friction in the determination. In a broad aspect, energy required to maintaining a stable velocity of the basket is subtracted from energy required to accelerate the basket with the remaining energy being that associated with the load itself and that is, in turn, proportional to load size.

Washing Machine Introduction

Figure 1:
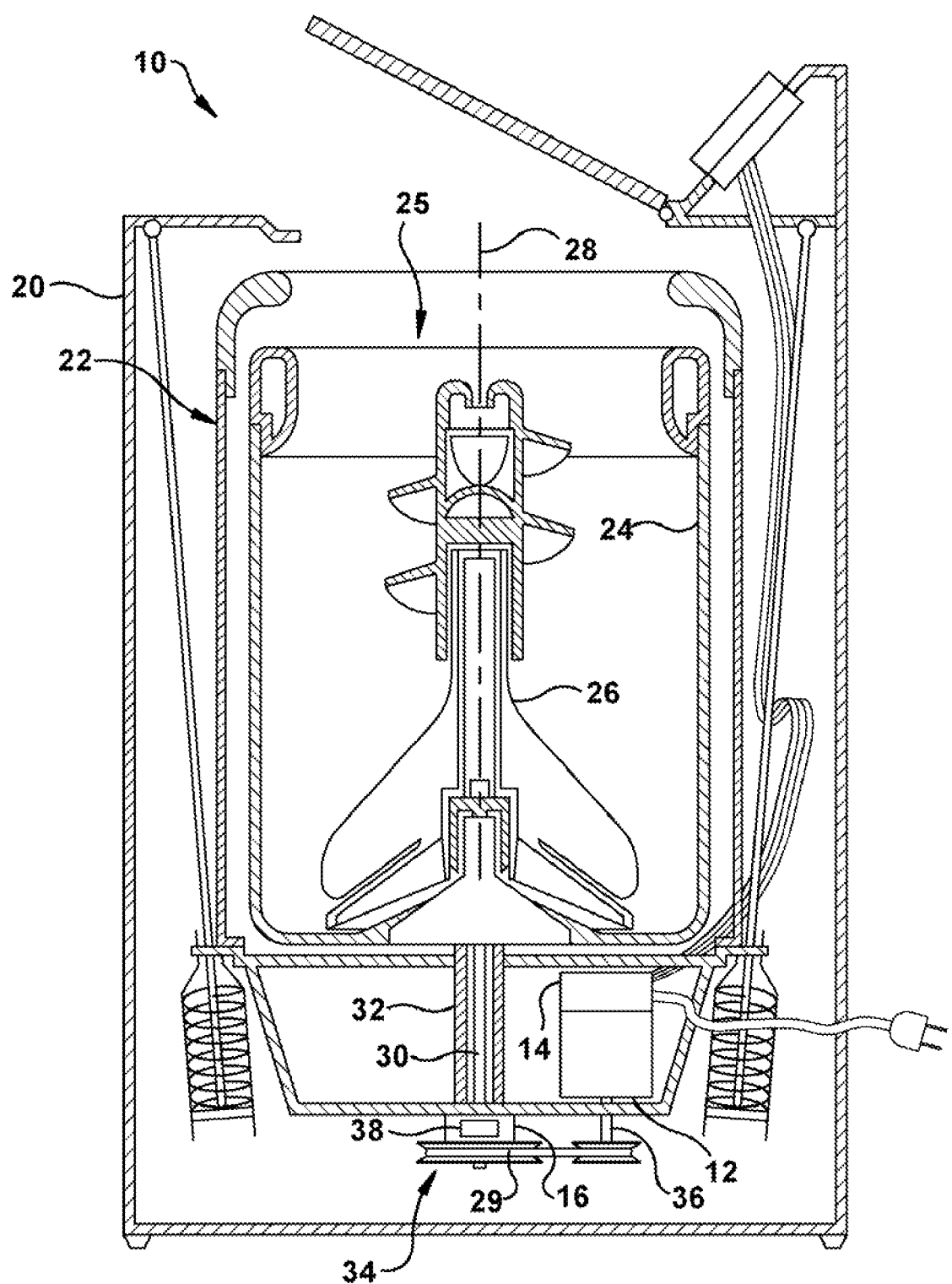
FIG. 1 is a sectional view of a vertical axis washing machine according to an exemplary embodiment of the present invention.

Referring to the drawings and in particular to FIG. 1, a washing machine ("washer") according to an exemplary embodiment of the present invention is illustrated and is generally referred to by reference numeral 10. For purposes of clarity, aspects of washer 10 necessary for understanding of the present disclosure, as well as aspects helpful in understanding the operation of washer 10 are described herein. Washer 10 described herein can be a vertical axis washer 10 as is illustrated in FIG. 1 or a horizontal axis washer 10, as is illustrated in FIGS. 2 and 3. One of ordinary skill in the art can perform the exemplary embodiments of the invention described herein using either configuration. Like reference numerals are used in the horizontal and vertical axis washer illustrations.

Washer 10 includes a motor 12 and a motor control unit 14. Motor 12 is a three-phase alternating current (AC) induction motor and, in some embodiments includes motor control unit 14 integral therewith. The motor control, integral therewith is referred to herein as integrated control and motor (ICM) or control circuitry. Motor control unit 14 can include circuitry customized for an exemplary embodiment of the present invention. Alternately a motor control circuit that is supplied independently of the motor could be used as can be determined by one of ordinary skill in the art. For purposes of illustration, the independent control circuit 14 is in the same block diagram configuration as the integrated motor control circuit 14 and therefore, not separately illustrated. The washer 10 is provided with input power such as single phase AC power input 48, illustrated in FIG. 4.

Washer 10 includes an outer housing or cabinet 20 supporting a fixed tub 22, a basket or moving tub ("tub") 25, an agitator 26, motor 12, and motor control unit 14 in a known manner. Agitator and basket drive shafts 30, 32 are also illustrated. Basket 25 is configured to hold articles (not shown) such as clothes to be washed. Circuit 14 is configured so that it causes the circuit 14 to control the motor in a manner that results in determination of load size (load not shown). The control circuit includes a counter C and memory 56 for storage of load size data and other appropriate data as may be determined by one of ordinary skill in the art.

During a spin cycle, basket 25 and agitator 26 are configured to be driven by motor 12 via motor drive shaft coupled to drive belt 29 to rotate at a high speed about axis 28. In this manner, liquid within the articles is removed by the centrifugal force imparted by the spin cycle and is allowed to exit the basket through openings (not shown). However, during a washing cycle, agitator 26 is configured to be driven by motor 12 to rotate back-and-forth about axis 28 so that the clothes in the basket are agitated. For example, agitator 26 is secured to an agitator drive shaft 30 and basket 25 is secured to a basket drive shaft 32. Motor 12 is coupled to mode shifter 16 by a transmission 34. In the vertical washer configuration of FIG. 1, transmission 34 is configured to transmit rotary motion imparted on a motor shaft 36 by motor 12 to mode shifter 16 via drive belt 29. In the horizontal washer configuration of FIG. 2, a direct belt drive is configured to transmit rotary motion imparted on a motor shaft 36 by motor 12 to tub 25 via drive belt 29. FIG. 3 illustrates a side view of the exemplary washer of the present invention along lines 2-2 of the cross sectional view of FIG. 2.

During a spin cycle, basket 25 and agitator 26 are configured to be driven by motor 12 to rotate at a high speed about axis 28. In this manner, liquid within the articles is removed by the centrifugal force imparted by the spin cycle and is allowed to exit the basket through openings (not shown). During the spin cycle, basket 25 has an inertial load comprising the inertial load from the articles and inertial load inherent to the basket 25. During spin cycle articles or clothing becomes plastered to the wall of basket 25 at a first speed or plaster speed. Plaster refers to the centrifugal force of the spin cycle pushing the clothing against the wall or structure of the basket. The clothes remain positioned by centrifugal force during a time period the first speed or plaster speed to a second speed or maximum speed of the spinning basket. The plastered speed and maximum speed can be determined by one of ordinary skill in the art.

Load Detection

Figure 4:
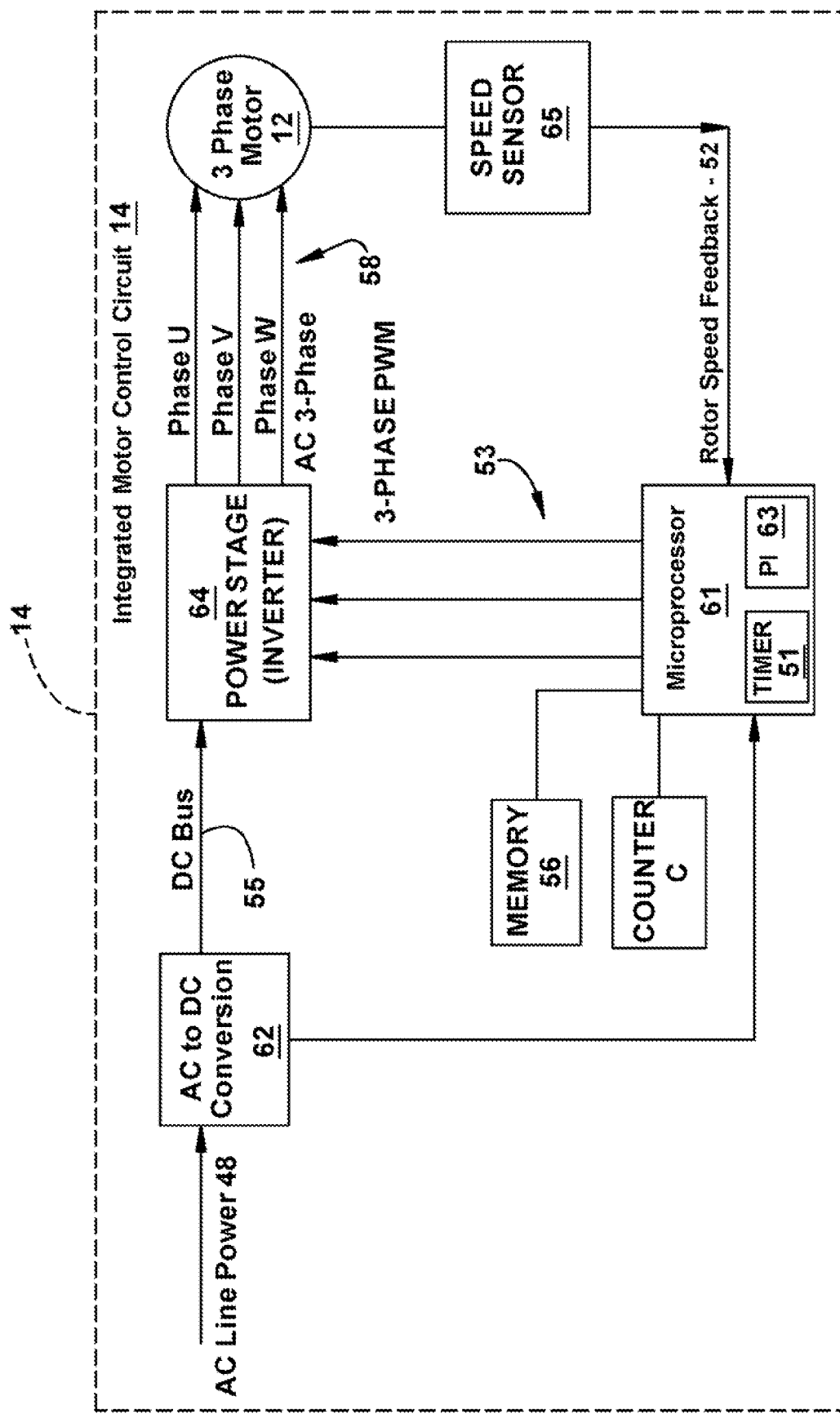
FIG. 4 illustrates a functional block diagram of an exemplary embodiment of load size measuring circuit in accordance with the present invention.

Referring now to FIG. 4, the exemplary electronic control circuits of the present invention include components, e.g., a processor such as a microprocessor 61 that can be programmed using a programming language such as C, C++ or assembly language. Alternately the microprocessor could be an application specific integrated circuit (ASIC). The type of microprocessor used in the control circuit could be determined by one of ordinary skill in the art.

Another component illustrated in the examples of the present invention is an AC to DC converter component 62 for converting single phase input power, such as conventional residential voltage of 110 v, 60 Hz in the US or 230 v, 50 Hz elsewhere, to DC voltage. Microprocessor 61, in addition to other functions as described in more detail below, is configured to drive the power stage 64 (inverter) appropriately to convert the DC voltage into 3-phase AC, typically by pulse-width modulation (PWM). The choice of components in the power stage can be determined by one of ordinary skill in the art. For example, the power stage could comprise IGBTs (not shown) and Gate Drivers (not shown). The output of exemplary inverter 64 is 3-phase voltage labeled phases U, V and W. One of ordinary skill in the art would be familiar with the U, V and W phase nomenclature, while others may be familiar with typical/similar phase A, phase B and phase C nomenclature (not shown). The output voltage of the inverter 64 is input voltage 58 to the 3-phase induction motor 12 that is the exemplary motor for the embodiments of the invention described herein. In a known manner, the control circuit 14, via microprocessor 61 and power inverter 64, adjusts output frequency and amplitude of voltage 58 to the motor 12 to achieve and maintain a desired speed level. In more detail, the microprocessor 61 outputs a signal to the inverter; the signal causes the inverter to adjust the frequency and amplitude of voltage to the motor 12 which correspondingly varies the rotational speed of the motor shaft. The microprocessor may comprise a slew rate limiter module that prevents the inverter from varying frequency and amplitude too greatly as known in the art.

Figure 6:
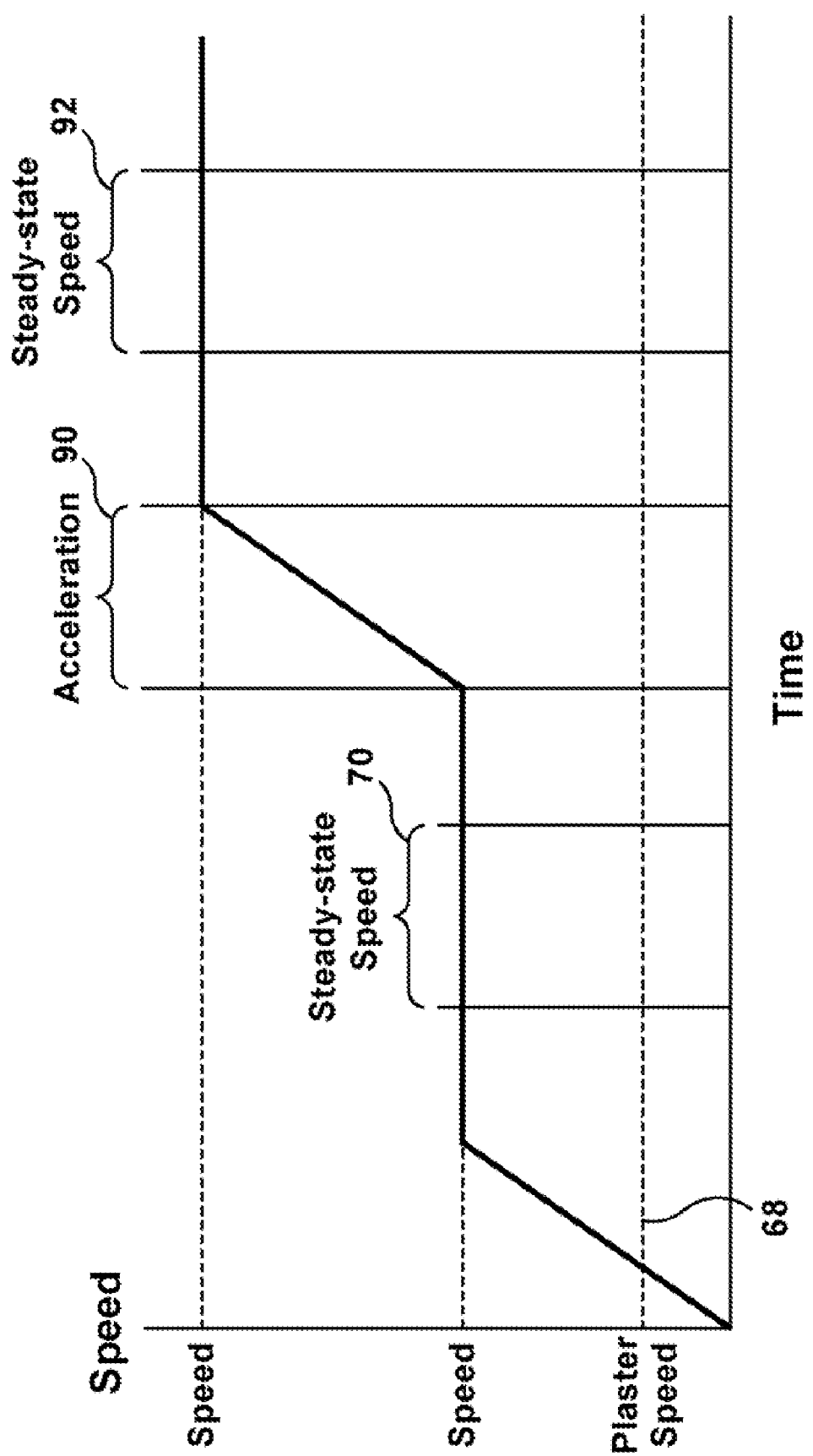
FIG. 6 is a graph of a rotational speed of a motor versus time.

Plastering of articles or clothing (not shown) to the drum is a prerequisite to the calculations and/or measurements of an exemplary embodiment of the present invention. Plastering is important because the load substantially stops moving within and relative to the drum. This allows the mechanical speed to stabilize and readies the load for the calculations and/or measurements performed in the exemplary embodiment of the present invention. A plaster speed 68 associated with plastering of the articles is shown in FIG. 6. In a vertical axis washing machine application, plastering may not be necessary because the clothes are more stable at low speeds. The load inertial energy to load size conversion table may be adjusted to correct for placement of the clothing.

The microprocessor 61, in accordance with an embodiment of the invention, in a broad aspect may be configured to determine a friction energy (FE) and an acceleration energy (AE) and thereafter subtract FE from AE to provide a load inertial energy (LE) that may be correlated with a load size (in kilograms or pounds).

In general, if slip is held constant, energy (over a given time period) may be determined using the equation (1).

$$E = \int_{t_1}^{t_2} \frac{V^2}{S} dt \tag{1}$$

Where:
E=Energy;
V=Output voltage amplitude to the motor;
t=time; and
S=speed of the motor.

In the present embodiment, FE may be ascertained by determining the energy required to maintain a steady state speed 70 (FIG. 6) of the basket or tub 22. Accordingly, speed and voltage used to determine FE may be the actual speed at the steady state speed 70 that is at or above the plaster speed 68.

In accordance with Newton's first law of motion, when the motor is spinning a load at steady-state, it must only overcome friction to maintain the steady-state speed. Therefore, if we measure the output energy while at a constant steady-state speed, we are measuring friction energy (FE).

This assumes the friction is constant, so the clothes must be plastered to prevent them from moving during this steady-state period. Plastering also ensures a better reading because less energy is required as the load moves toward the rotational center of the washer drum.

It will be understood that the actual speed may be replaced by an ideal or target speed as described in more detail below.

Figure 5:
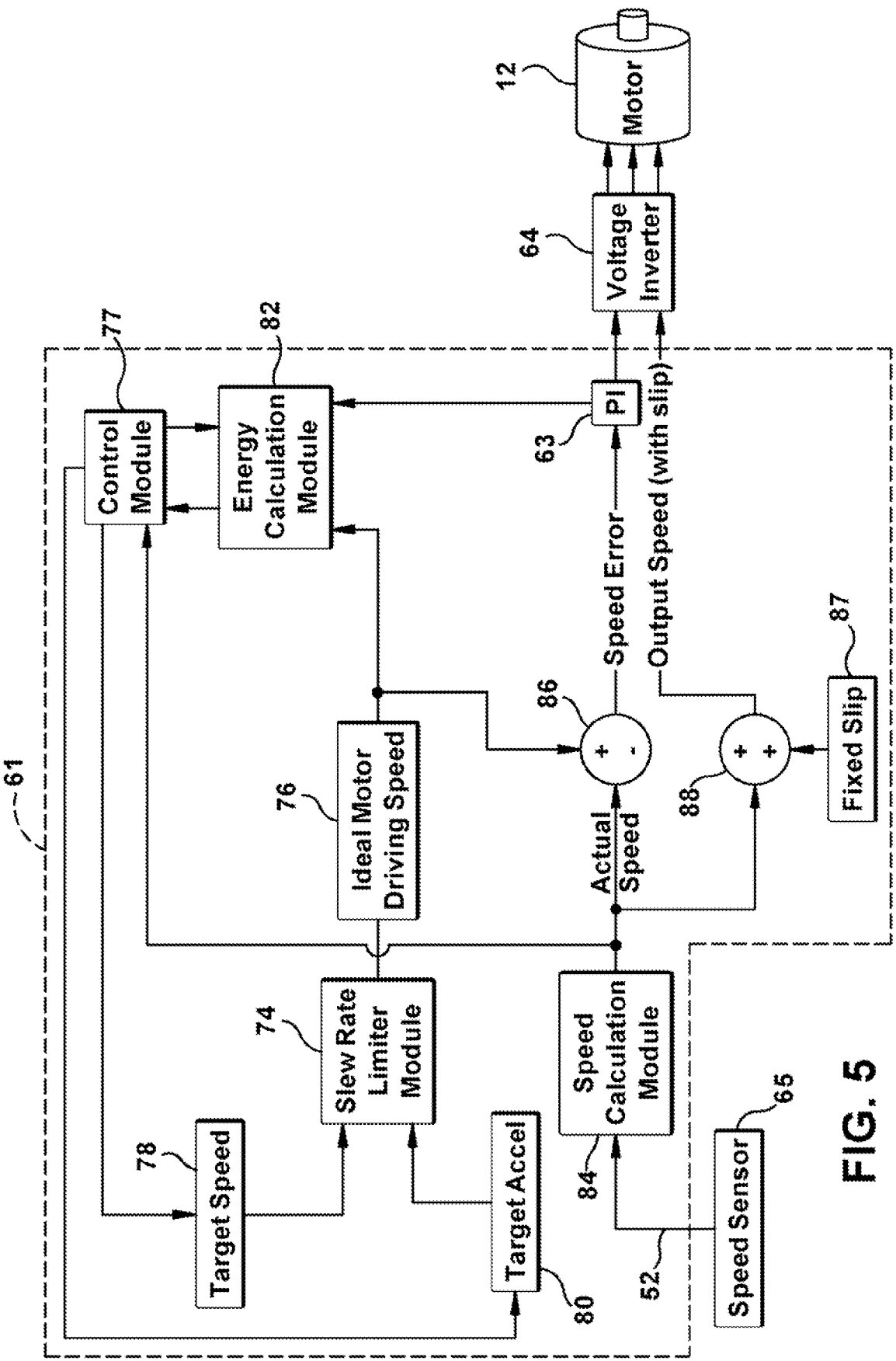
FIG. 5 is a flow diagram showing functional aspects carried out by a processor for determining a load size in accordance with one particular embodiment of the present invention.

As shown in FIG. 5, the microprocessor 61, may be configured to utilize an ideal driving speed (DS) 76 from a slew rate limiter module 74 as an input of speed to equation (1). The slew rate limiter module 74 receives inputs of target speed 78 and target acceleration 80, which are provided by a control module 77 based on a desired increase (or decrease) in speed of the motor 12.

An energy calculation module 82 is connected to receive the output slew rate limiter speed value along with voltage information from the output of the proportional integral (PI) control 63 that provides the other input for equation (1).

The microprocessor 61 may be configured to employ a speed calculation module 84 which calculates an actual speed which is combined at 86 with the ideal driving speed (DS) 76 to create a speed error value for input to a proportional integral (PI) control 63 and thereafter to the inverter 64.

The microprocessor 61 may also compensate or hold slip constant by combining a fixed slip speed 87 with the actual speed at 88 that may also be input to the inverter 64. The fixed slip speed 87 ensures that the motor 12 will be driven at a frequency that is ahead of the actual speed of the motor so that the motor slip remains constant. This is necessary because the V2 term in the energy equation is a function of torque. If slip is allowed to change, the operating point on the speed-torque curve will not be constant and the torque will be variable violating a major assumption in the energy equation (1).

Referring to FIGS. 5 and 6, the energy calculation module 82 calculates a preliminary FE using equation (1) after control module 77 determines via speed calculation module 84 that the basket 22 has reached a steady state speed 70. Next, the control module 77 will provide a target speed 78 and target acceleration rate 80 via the slew rate limiter module 74 to the PI 63 and, in turn, inverter 64 whereby an acceleration of the motor 12 occurs. Acceleration of the motor 12 occurs, represented by period 90, until the motor reaches a second steady state speed 92. Next, a calculation of AE may be performed using the energy calculation module 82. As the motor 12 accelerates via slew rate limiter module 74, the ideal driving speed (DS) 76 is plugged into the equation (1) along with a voltage measurement from the PI 63. This occurs repeatedly until the second steady state speed 92 is reached. Determinations may be taken over the time as necessary and at regular intervals such as every 10 milliseconds with the summed total representing AE. To correlate the preliminary FE with AE, the preliminary FE is multiplied by the number of intervals or readings taken to determine AE. The FE and AE are arranged to represent the same time period (or same number of samples) to be compatible.

Once both FE and AE have been determined, the microprocessor 61 is configured via control module 77 to subtract FE, which contains an energy value associated with friction, from AE, which contains an energy value of both friction and that required to accelerate a load itself, thereby resulting in a load inertial energy (LE).

In an optional embodiment, the microprocessor 61 may be further configured to make at least two determinations, for example FE and a supplemental FE (SFE) at different steady state speeds such as at steady state speed 70 and at stead state speed 92. Thereafter, FE and SFE may be averaged together and then multiplied by the number of intervals or readings taken to determine AE prior to subtracting from AE whereby all energy values are arranged to contain the same number of samples, and represent the same time period for compatibility.

Figure 7A:
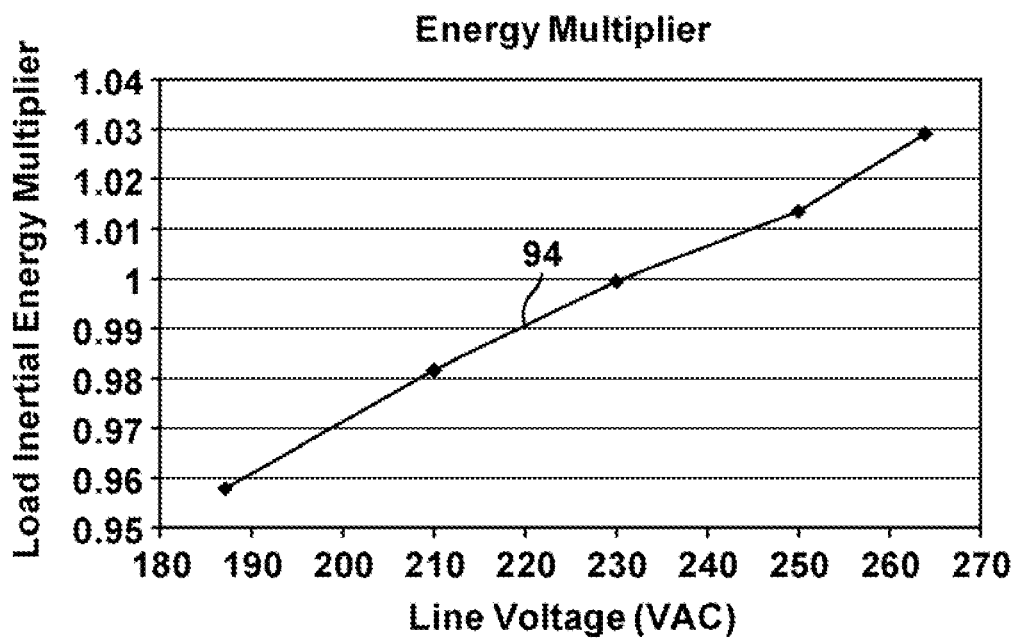
FIG. 7a is a graph of an energy multiplier showing a load inertial energy multiplier versus line voltage.
Figure 7B:
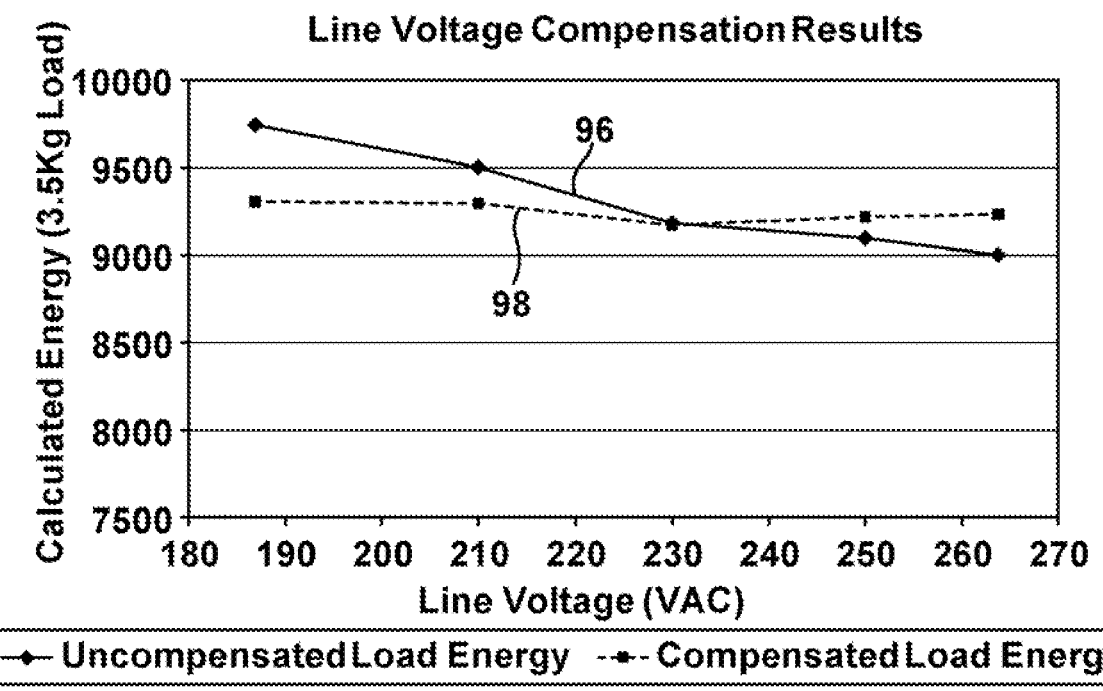
FIG. 7b is a graph of line voltage compensation results showing calculated load inertial energy versus line voltage.

In another optional embodiment and referring now to FIGS. 7a and 7b, a variation in line voltage may be compensated for in LE. Variations in line voltage from the nominal condition affect the result of the energy measurements because, e.g., the motor must drive harder to maintain speeds under low line conditions and the opposite for high line conditions.

The load inertial energy (LE) value may be compensated via a look up table based on the plot 94 of FIG. 7a. This is necessary because the ripple voltage on the DC link increases as the line voltage drops. If left uncompensated, this will impact the $V^2$ Term in Energy Equation (1). FIG. 7b shows how uncompensated load energy results 96 and compensated load energy results 98 were found to vary based on various line voltages.

Figure 8:
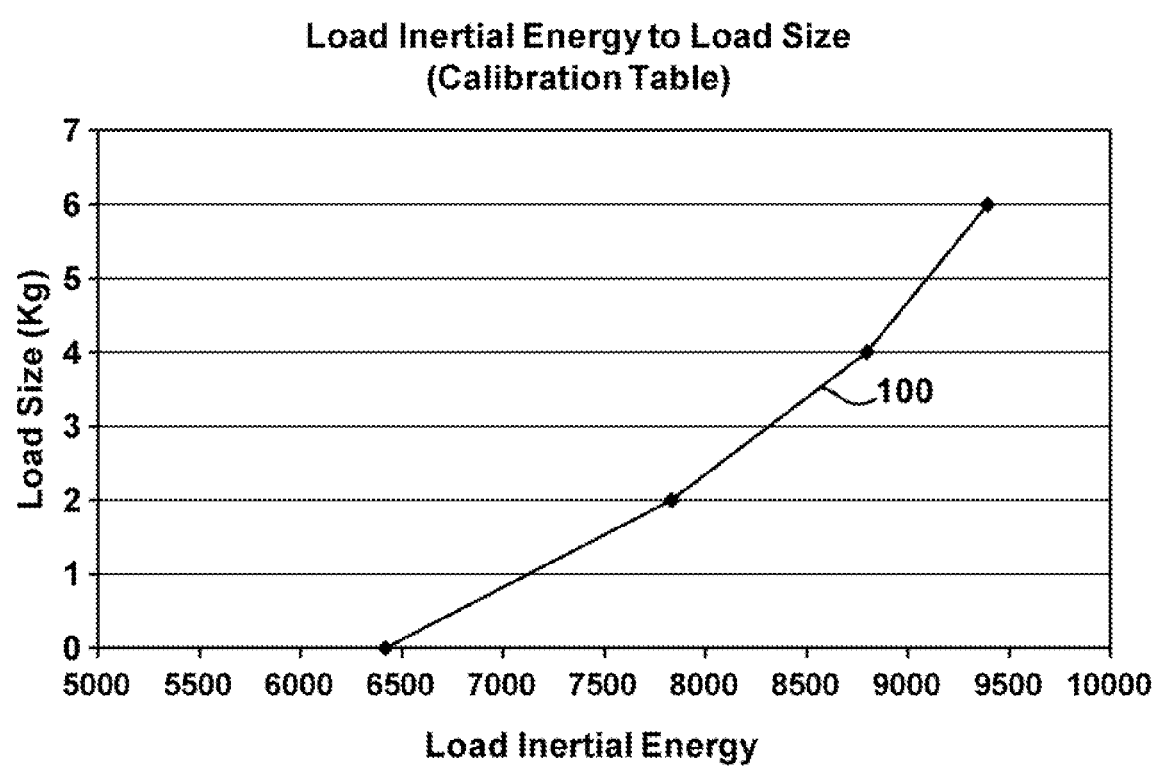
FIG. 8 illustrates a graph used to convert calculated load inertial energy into load size (in kilograms).

Referring now to FIG. 8, LE value may be converted to a load size using a look up table based on the load inertial energy to load size conversion curve 100. It will be understood that load size is shown in kilograms for illustrational purposes only and that load size may be instead provided in pounds or other mass measurement.

It will be understood that while an above embodiment is described as comprising first accelerating a basket to a first stable speed and determining FE then accelerating the basket to a second stable speed and determining AE, another embodiment of the present invention may comprise measuring AE during the first acceleration prior to attaining a first stable speed and then determining FE while at the first stable speed. Also, it will be understood that multiple determinations of AE and/or FE are also contemplated by the present invention such as accelerating to a first stable speed and determining a first AE value and then accelerating to a second stable speed and determining a second AE value and summing those values together. This may be occurring while FE is measured at the first and/or second stable speeds. Further, in still another embodiment, multiple PFE determinations may be made over the same number of repetitions that AE is determined and then summed together to obtain FE.

Advantages to the embodiments of the present invention include that cost is reduced because various, prior art components are not required. Additionally the exemplary method of the present invention can be performed on a dry load or a wet load. Dedicated sensors are not used in the exemplary embodiments of the present invention; time and speed are measured and/or calculated, hence there is a cost reduction in materials per unit.

The present invention can be performed in both horizontal axis and vertical axis washers, as may be determined by one of ordinary skill in the art.

The aforementioned embodiments of the present invention use an exemplary motor platform that is an AC induction motor. In an alternate embodiment of the present invention a different motor platform that is not an AC Induction motor may be used. One of ordinary skill in the art could determine an appropriate motor platform for the present invention. It should be noted that the control circuit 14 could be a circuit other than a circuit of a commercially available integrated motor and control.

The exemplary inventions discussed herein accomplish load detection by elimination of components such as pressure switches or pressure transducers, (for example, pressure switch coupled to the tub when the tub is still) and associated circuitry to determine load size and/or by the use of an adaptive circuit that provides for consistent operation of the washing machine over varying frequency and amplitude electrical input.

It should also be noted that the terms "first", "second", "third", "upper", "lower", and the like may be used herein to modify various elements. These modifiers do not imply a spatial, sequential, or hierarchical order to the modified elements unless specifically stated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of measuring a size of a load in a basket that is rotatably supported, the method comprising:
   accelerating the basket to a first stable rotational speed;
   determining a preliminary friction energy (PFE) required to maintain the first stable rotational speed of the basket;
   accelerating the basket to a second stable rotational speed;
   determining, on an iterative basis, an acceleration energy (AE) required to accelerate the basket from the first stable rotational speed to the second stable rotational speed by measuring an output voltage (V2) while accelerating to the second stable rotational speed and measuring a driving speed (DS2) while accelerating to the second stable rotational speed;
   calculating a preliminary acceleration energy (PAE) where:

$PAE=(V_2^2)/DS_2$;

determining a friction energy (FE) from the preliminary friction energy (PFE) and PAE;
   subtracting the friction energy (FE) from the acceleration energy (AE) to obtain a load inertial energy (LE); and
   determining a load size from the load inertial energy (LE).

2. The method of claim 1, wherein:
   accelerating the basket to a first stable rotational speed comprises accelerating the basket until a load speed substantially equals or is greater than a predetermined plastered speed;
   determining an acceleration energy further (AE) comprises:
      repeating, at predetermined intervals, calculating PAE until the basket has reached the second stable rotational speed;
      counting the number of times PAE is calculated;
      summing all of the PAE values to obtain AE;
   determining a preliminary friction energy (PFE) comprises:
      measuring an output voltage (V1) while at the first stable rotational speed and measuring a driving speed (DS1) while at the first stable rotational speed; and
      calculating a preliminary friction energy (PFE) where:

$PFE=(V_1^2)/DS_1$; and determining a friction energy (FE) comprises calculating FE by multiplying PFE by the number of times PAE is calculated.

3. The method of claim 2, wherein measuring a driving speed (DS1) while at the first stable rotational speed and measuring a driving speed (DS2) while at the second stable rotational speed each comprise using a slew rate limiter (SRL).

4. The method of claim 1, wherein determining a load size from the load inertial energy (LE) comprises compensating for variations in line voltage.

5. The method of claim 1, wherein determining a load size from the load inertial energy (LE) comprises using a lookup table that maps load inertial energy (LE) to load size in kilograms (Kg) and/or pounds (lbs).

6. The method of claim 3, wherein the slew rate limiter (SLR) target value is output from a slew rate limiter that receives target speed and target acceleration information.

7. A method of measuring a size of a load in a basket that is rotatably supported, the method comprising:
   accelerating the basket to a first stable rotational speed comprising accelerating the basket until a load speed substantially equals or is greater than a predetermined plastered speed;
   determining a preliminary friction energy (PFE) required to maintain a first stable rotational speed of the basket comprising measuring an output voltage (V1) while at the first stable rotational speed and measuring a driving speed (DS1) while at the first stable rotational speed and calculating the preliminary friction energy (PFE) as follows:

$PFE=(V_1^2)/DS_1$;

accelerating the basket to a second stable rotational speed;
   determining a preliminary acceleration energy (PAE) required to accelerate the basket from the first stable rotational speed to the second stable rotational speed comprising measuring an output voltage (V2) while at the second stable rotational speed and measuring a driving speed (DS2) while at the second stable rotational speed and calculating the preliminary acceleration energy (PAE) as follows:

$PAE=(V_2^2)/DS_2$;

repeating, at predetermined intervals, calculating PAE until the basket has reached the second stable rotational speed;
   counting the number of times PAE is calculated;
   summing all of the PAE values to obtain an acceleration energy (AE);
   determining a friction energy (FE) by multiplying PFE by the number of times PAE is calculated;
   determining a supplemental friction energy (SFE) required to maintain the second stable rotational speed of the basket and wherein the supplemental friction energy (SFE) comprises using the output voltage (V2) while at the second stable rotational speed and measuring a driving speed (DS3) while at the second stable rotational speed and calculating the supplemental friction energy (SFE) as follows:

$SFE=(V_2^2)/DS_3 *(\text{number of times PAE is calculated})$ calculating an average friction energy (AFE) as follows:

$AFE=(FE+SFE)/2$;

subtracting the average friction energy (AFE) from the acceleration energy (AE) to obtain a load inertial energy (LE); and
   determining a load size from the load inertial energy (LE).

8. The method of claim 7, wherein measuring a driving speed (DS1) while at the first stable rotational speed, measuring a driving speed (DS2) while accelerating to the second stable rotational speed and measuring a driving speed each comprise using a slew rate limiter (SLR) target value.

9. The method of claim 7, wherein determining a load size from the load inertial energy (LE) comprises compensating for variations in line voltage.

10. The method of claim 7, wherein determining a load size from the load inertial energy (LE) comprises using a lookup table that maps load inertial energy (LE) to load size in kilograms (Kg) and/or pounds (lbs).

11. The method of claim 8, wherein the slew rate limiter (SLR) target value is output from a slew rate limiter that receives target speed and target acceleration information.

* * * * *